US011195640B2

(12) United States Patent
Pozzati et al.

(10) Patent No.: US 11,195,640 B2
(45) Date of Patent: Dec. 7, 2021

(54) PROCESS FOR MANUFACTURING A SUBMARINE POWER CABLE AND POWER CABLE SO MANUFACTURED

(71) Applicant: PRYSMIAN S.p.A., Milan (IT)

(72) Inventors: Giovanni Pozzati, Milan (IT); Fabrizio Cristofani, Milan (IT); Silvio Frigerio, Milan (IT); Paolo Liboi, Milan (IT)

(73) Assignee: PRYSMIAN S.p.A., Milan (IT)

(*) Notice: Subject to any disclaimer, the term of this patent is extended or adjusted under 35 U.S.C. 154(b) by 0 days.

(21) Appl. No.: 17/017,618

(22) Filed: Sep. 10, 2020

(65) Prior Publication Data
US 2021/0082599 A1 Mar. 18, 2021

(30) Foreign Application Priority Data

Sep. 16, 2019 (IT) .......... 102019000016406

(51) Int. Cl.
H01B 7/20 (2006.01)
H01B 7/14 (2006.01)
H01B 7/18 (2006.01)
H01B 9/00 (2006.01)
H01B 13/22 (2006.01)
H01B 13/24 (2006.01)

(52) U.S. Cl.
CPC .......... *H01B 7/20* (2013.01); *H01B 7/14* (2013.01); *H01B 7/187* (2013.01); *H01B 9/00* (2013.01); *H01B 13/22* (2013.01); *H01B 13/24* (2013.01)

(58) Field of Classification Search
CPC ... H01B 1/02; H01B 7/14; H01B 7/20; H01B 7/2825; H01B 9/006; C09J 7/20; C09J 201/02

USPC .......... 174/47, 105 R, 106 R, 107, 102 SP, 174/102 SC, 113 R, 116; 156/244.11, 84
See application file for complete search history.

(56) References Cited

U.S. PATENT DOCUMENTS

| 3,394,450 A * | 7/1968 | Gill .......... B21C 37/09 29/430 |
| 3,575,748 A * | 4/1971 | Polizzano .......... H01B 13/266 156/54 |
| 5,191,173 A * | 3/1993 | Sizer .......... E21B 17/206 174/102 R |
| 9,058,917 B2 * | 6/2015 | Koelblin .......... H01B 7/045 |

(Continued)

FOREIGN PATENT DOCUMENTS

GB         753935 A    8/1956
WO    2014/206474 A1   12/2014

*Primary Examiner* — William H. Mayo, III
(74) *Attorney, Agent, or Firm* — Seed IP Law Group LLP

(57) ABSTRACT

Process for manufacturing a power cable includes: providing a power cable core having an electric conductor; providing a copper foil; providing a protective strip over the power cable core, the protective strip having a radially inner and outer surface and being made of copper with a coating; folding the copper foil around the power cable core so as to bring two longitudinal copper foil rims to contact one to the other; welding the two contacted longitudinal copper foil rims thus obtaining a copper sheath in form of a tube with a welding seam; reducing the diameter of the copper sheath to put it into direct contact with the power cable core and the protective strip; heating the protective strip and the copper sheath at a temperature higher than the melting temperature of the coating of the strip so that the coating fuses in the welding seam.

15 Claims, 3 Drawing Sheets

(56) References Cited

U.S. PATENT DOCUMENTS

| | | | | |
|---|---|---|---|---|
| 2011/0048765 A1* | 3/2011 | Eggertsen | ............... | H01B 7/045 174/107 |
| 2016/0141076 A1* | 5/2016 | Perego | ............... | H01B 13/2613 427/455 |
| 2018/0202242 A1* | 7/2018 | O'Grady | ............... | E21B 17/206 |

* cited by examiner

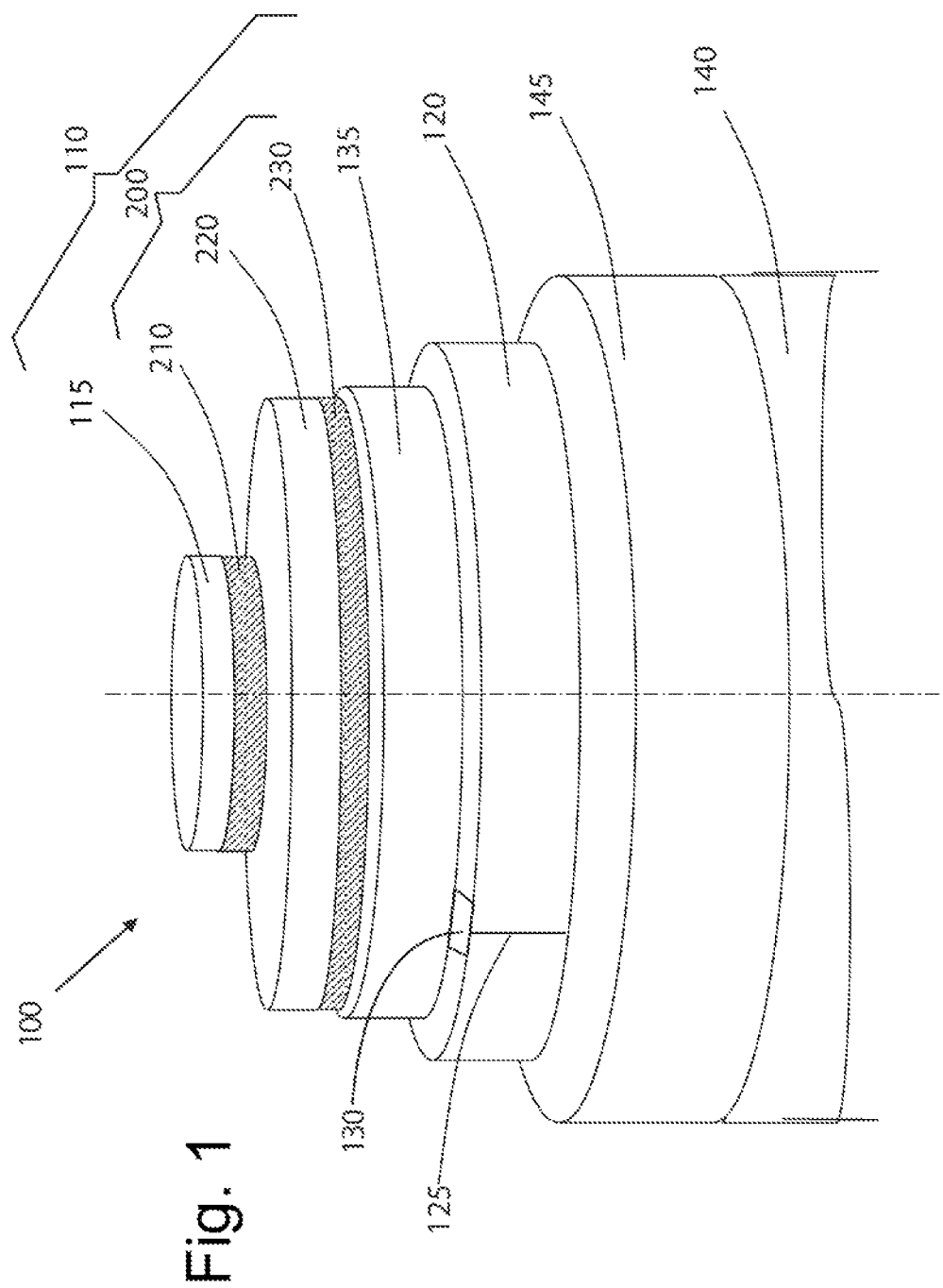

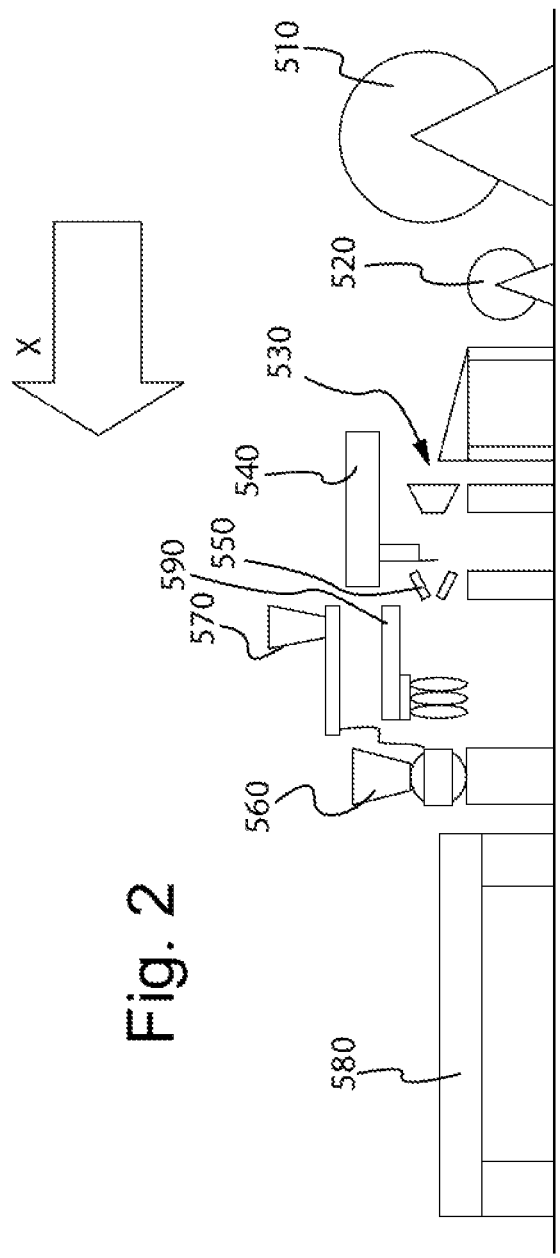

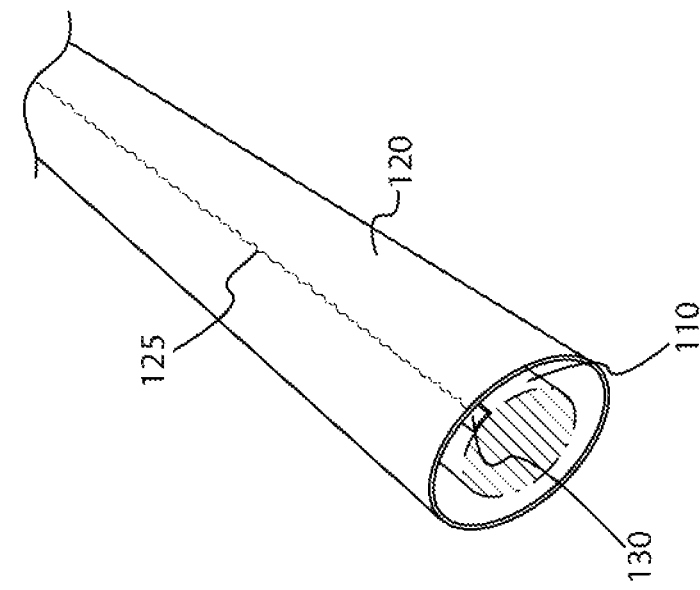
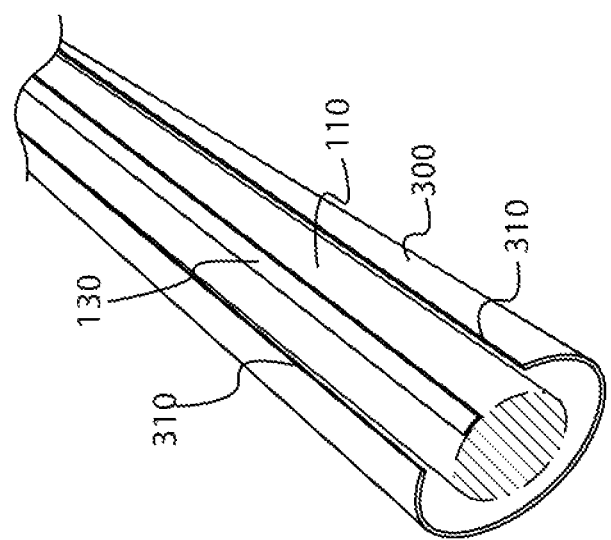
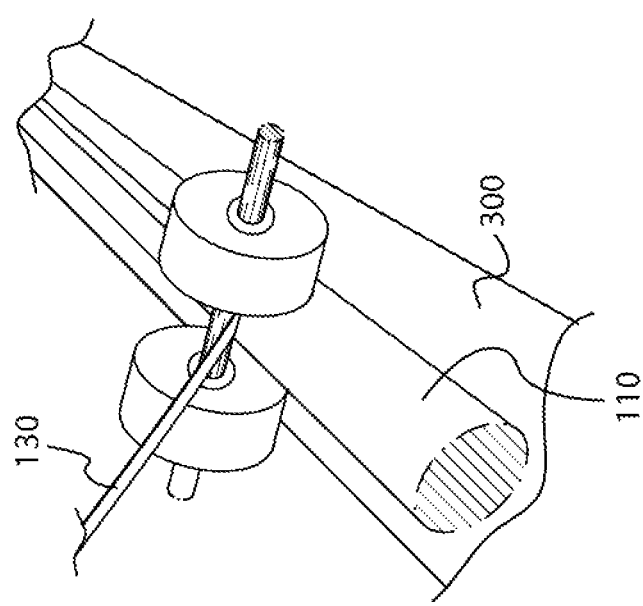

PROCESS FOR MANUFACTURING A SUBMARINE POWER CABLE AND POWER CABLE SO MANUFACTURED

BACKGROUND OF THE DISCLOSURE

The present description refers to a process for manufacturing a power cable, particularly, but not exclusively, a high voltage power cable for underwater or underground deployment.

The present description refers to a power cable manufactured through the above process.

In this specification, the expression "high voltage" (HV) indicates voltages equal or greater than 30 KV. Typically, a power cable, particularly a HV power cable, includes at least one cable core usually formed by an electrically conductive metal conductor covered by an insulation system. The insulation system is sequentially formed by an inner polymeric semiconductive layer, an intermediate polymeric insulating layer, and an outer polymeric semiconductive layer. The insulation system is surrounded by one or more protective layers.

When a power cable is to be installed in a wet or potentially wet environment, such as underwater or underground, the cable core should be protected from humidity or water penetration that may lead to electrical breakdown. For this purpose, submarine or underground power cable typically include a metallic barrier surrounding each cable core of the power cable (in this case, the cable core further comprises a cushion layer surrounding the outer polymeric semiconductive layer) so as to block water penetration during installation and operation of the cable. The metallic barrier can be made of aluminium, lead or copper. Copper is lighter than lead and less prone to corrosion than aluminium.

The metallic barrier can be made by extrusion, especially in case of a lead barrier, or in form of a longitudinally folded sheath with welded rims or overlapped and glued rims.

With respect to the longitudinally folded sheath with overlapped and glued rims, the longitudinally folded sheath with welded rims is more reliable against water penetration under the high pressure conditions like at underwater depths greater than, e.g., 1000 m.

The metallic barrier can have a straight or wavy longitudinal cross-section (hereinafter also referred to as, respectively, "straight metal barrier" and "corrugated metal barrier"), also depending on the power cable application. The power cable can be deployed as a static cable, which is laid on a surface like the sea bed between fixing point, or as a dynamic cable, which is suspended underwater and therefore is exposed to motions of the sea water, like the sea currents and/or waves. In the latter case, a corrugated metallic barrier provides more flexibility to the power cable with respect to a straight metallic barrier. Furthermore, the metallic barrier can be covered by a polymeric, optionally semiconductive, protective sheath.

The manufacturing process of a power cable with a copper barrier made from a longitudinally folded sheath with welded rims typically comprises the steps of folding a copper foil around each cable core, welding the rims and reducing the overall diameter of the resulting copper barrier, usually by drawing, so as to put its inner surface into contact with the outer surface of the cable core.

After the drawing step, one or more polymeric sheaths can be extruded around the copper barrier. After the drawing step and before entering into the extruder the power cable with the metallic barrier is heated in order to ensure the adhesion with the polymeric sheath to be extruded.

GB753935 relates to sheathed cables utilising an aluminium sheathing and the process for making same. The method for applying aluminium sheathing comprises providing cable with a closely surrounding open seam metal tubing, causing the opposed seam edges of the tubing to come into contact with each other, causing the seam edges to fuse together by an electromagnetic field. The tube has diameter closely approximating that of the cable. After fusion of the seam edges, the sheathed cable is passed through sizing rolls which will give the sheathing a slight reduction in size. In order to prevent any damage to the insulation by welding flash and excessive heat produced during the fusion of the opposed seam edges, it is provided a protective strip on the upper area of the cable. The strip can be made of any suitable material, e.g. aluminium foil, glass, asbestos, etc.

U.S. Pat. No. 3,575,748 discloses a method of making electrical cable electric cable with a lap seam made with tape that is plastic except for the thin vapor barrier lamination of metal, such as aluminum or copper. A tape is bent longitudinally into a tube with a lap seam around the core. A second, narrower tape (bridging or reinforcing) is also advanced. The tape and the second tape can have the same construction. The tape is made of a metal foil laminate with plastic coating on both its upper and lower surface. The metal foil is preferably aluminum or copper. The bridging tape is located under the lap seam. The plastic coatings on the tapes are heated sufficiently to cause them to bond together.

SUMMARY OF THE DISCLOSURE

The inventors faced the problem of providing a power cable, particularly for submarine applications, capable to withstand water penetration under the high pressure conditions present at high underwater depths, e.g., more than 1000 m, particularly more than 1500 m.

The inventors, then, considered a power cable with each core surrounded by a copper barrier, which is in the following also referred to as "copper sheath," in form of a longitudinally folded copper foil with welded rims. The welding of the copper foil rims is performed at a temperature higher than the melting temperature of the copper, 1080° C., for example at a temperature of about 1100° C.

The inventors has observed that the heat and vapour generated during the welding step may locally melt and/or damage the cable core polymeric layers underlying the welding seam.

The inventors has also observed that the welding seam can present some defects, for example holes less than 0.5 $mm^2$, that cannot be reliably detected and through which water at high pressure can penetrate through the metallic barrier.

In the disclosed technique, a strip is provided on the power cable before the welding step, the strip being positioned under the welding seam.

The inventors found that a strip made of copper and coated, at least on the radial outer surface, with a metal or a metal alloy having a melting temperature in a range between 90° C. and 250° C. can overcome the above-mentioned problems. During the welding step, the coated strip is spaced away by the copper barrier with a distance such that the strip is substantially not heated enough to melt. During the heating before the extrusion of the polymeric sheath, the coating of the strip melts and binds to the welding seam of the metal barrier thus repairing possible defects/holes not easily detectable, like those having dimensions less than 0.5 $mm^2$.

In this way, the inventors experienced that it is possible to guarantee that the welding seam can withstand water penetration also at great underwater depths, like for example at depth of about 2000 m.

The strip also acts as a protective barrier for the polymeric layers of the power cable against the heat and vapour generated during the welding step manufacturing the copper barrier.

Therefore, according to a first aspect, the present disclosure relates to a process for manufacturing a power cable comprising:

providing a power cable core comprising an electric conductor and having an outer diameter;

providing a copper foil having a width such that, after folding of the copper foil to provide a copper sheath around each power cable core, the copper sheath has an inner diameter from 5 to 15 mm greater than the power cable core outer diameter;

providing a protective strip over each power cable core in a position substantially matching a welding die, the protective strip having a radially inner and outer surface and being made of copper with a coating, at least on the radially outer surface, made of a metal or a metal alloy having a melting temperature comprised between 90° C. and 250° C.;

folding the copper foil around the power cable core so as to bring two longitudinal copper foil rims to contact one another;

welding the two contacted longitudinal copper foil rims with a welding die thus obtaining a copper sheath in form of a tube with a welding seam and having a diameter;

reducing the diameter of the copper shield to put it into direct contact with the power cable core and the protective strip;

heating the protective strip and the copper barrier at a temperature higher than the melting temperature of the coating of the strip so that the coating fuses in the welding seam;

extruding a polymeric sheath around the copper barrier.

In an embodiment, the reduction of the diameter of the copper barrier is obtained by rolling the copper barrier.

By the process of the present disclosure, the welding of the opposite longitudinal copper foil rims occurs at a sufficiently large distance from the outer surface of the power cable core and from the strip so as to avoid that the heat and vapour generated during the welding can damage the power cable core and the strip.

In an embodiment, the process of the present disclosure comprises, before the extrusion of the polymeric sheath, extruding an adhesive layer around the copper barrier.

In an embodiment of the process of the present disclosure, before the diameter reducing step, the copper sheath obtained in form of a tube has an inner diameter from 8 to 10 mm greater than the power cable core outer diameter.

According to a further aspect, the present disclosure relates to a power cable comprising:

a power cable core comprising an electric conductor and having an outer diameter;

a copper sheath surrounding each power cable core and being in form of a tube with a welding seam;

wherein the power cable comprises a protective strip having a radially inner and outer surface and made of copper with a coating, at least on the radially outer surface, made of a metal or of a metal alloy having a melting temperature comprised between 90° C. and 250° C., the coating being fused in the welding seam of the copper sheath.

In an embodiment, the power cable of the present disclosure comprises two or more power cable cores, for example three power cable cores.

In an embodiment of the power cable of the present disclosure, the copper sheath has a thickness in the range from 0.2 mm to 1.5 mm.

In an embodiment of the power cable of the present disclosure, the strip has a width comprised in the range from 15 mm to 50 mm. Such a size is proportional to the power cable core diameter. The width of the welding seam is safely within the width of the strip, thus guaranteeing the protection against water penetration at the welding seam.

In an embodiment of the power cable of the present disclosure, the protective strip has a thickness in the range from 0.05 mm to 0.3 mm. Such a thickness is sufficient for providing the power cable core with a suitable protection against heating during welding, while substantially not altering the roundness or other dimension properties of the finished power cable.

In an embodiment, the power cable of the present disclosure comprises a polymeric sheath around the copper barrier. Optionally, the polymeric sheath is semiconductive or comprises a semiconductive layer.

In an embodiment, the power cable of the present disclosure comprises an adhesive layer interposed between the copper barrier and the polymeric sheath.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Also, the terms "a" and "an" are employed to describe elements and components of the disclosure. This is done merely for convenience and to give a general sense of the disclosure. This description should be read to include one or at least one, and the singular also includes the plural unless it is obvious that it is meant otherwise.

As "power cable core", it is meant a cable portion including an electrically conductive metal conductor covered by an insulation system surrounded by a cushion layer. The insulation system is sequentially formed by an inner polymeric semiconductive layer, an intermediate polymeric insulating layer, and an outer. The cushion layer surrounds and directly contacts the outer polymeric semiconductive layer of the polymeric insulation system.

The cushion layer is made of a polymeric material, optionally semiconductive. The cushion layer can be an extruded polymeric layer or in form of tape helically wounded around the outer polymeric semiconductive layer. The cushion layer has a modulus of compression lower than that of the outer polymeric semiconductive layer.

As "insulating layer", it is meant a layer made of a material having a conductivity comprised between $10^{-16}$ and $10^{-14}$ S/m.

As "semiconductive layer", it is meant a layer made of a material having a conductivity comprised between $10^{-1}$ and 10 S/m.

As "modulus of compression", it is meant the ratio of mechanical stress to strain in an elastic material when that material is being compressed (modulus of compression=compressive force per unit area/change in volume per unit volume) as from, for example, ISO 604_1997-02.

BRIEF DESCRIPTION OF THE DRAWINGS

Further characteristics will be apparent from the detailed description given hereinafter with reference to the accompanying drawings, in which:

FIG. 1 is a schematic perspective sectioned view of a power cable according to an embodiment of the present disclosure;

FIG. 2 is a schematic view of the plant for manufacturing the power cable according to the present disclosure;

FIGS. 3a, 3b and 3c are three schematic perspective views of power cable of FIG. 1 during three successive steps of the manufacturing process.

DETAILED DESCRIPTION OF SOME EMBODIMENTS

With reference to FIG. 1, a power cable 100 according to the present disclosure is schematically represented.

The power cable 100 comprises a power cable core 110 comprising an electric conductor 115 and a polymeric insulation system 200 surrounding the electric conductor 115. The polymeric insulation system 200 is sequentially formed by an inner polymeric semiconductive layer 210, an intermediate polymeric insulating layer 220, and an outer polymeric semiconductive layer 230.

A copper barrier 120 in form of a tube with a welding seam 125 surrounds the power cable core 110. The copper barrier 120 acts as a water barrier and as electric screen.

The copper barrier can be a straight metallic barrier or a corrugated metallic barrier, also depending on the power cable application, static or dynamic, as explained herein.

The copper employed for the copper barrier can be a copper with electrical conductivity of at least 85% IACS (International Annealed Copper Standard), for example of at least 95% IACS. In some embodiment, a copper for the copper barrier is a high purity one with a copper content greater than 90% and a low oxygen content, for example from 50 ppm to 15 ppm or less.

The power cable 100 comprises a protective strip 130 interposed between the outer surface of the power cable core 110 and the copper barrier 120 and fused with the copper barrier 120 at the welding seam 125. The strip 130 is made of copper coated with a metal or of metal alloy having a melting temperature in a range between 90° C. and 250° C.

Examples of metal suitable as coating for the copper protective strip of the present disclosure are selenium and tin, and alloys comprising one or more of silver, antimony, tin, zinc and lead.

Examples of metal alloy suitable as coating for the copper protective strip of the present disclosure comprises one or more of silver, antimony, tin, zinc and lead, like lead-antimony alloy, lead-tin alloy, pewter (tin-antimony-copper alloy), Rose metal (bismuth-lead-tin alloy), silver-lithium alloy.

In an embodiment the protective strip is in direct contact with the outer surface of the power cable core.

In FIG. 1, the thickness of the protective strip 120 is magnified for clarity reason, but in the practice its thickness is relatively small such that the protective strip will substantially not alter the roundness of the cable cross-section.

The power cable core 110 can comprise a cushion layer 135 surrounding the polymeric insulation system 200, in particular in direct contact with the outer semiconductive layer 230.

The cushion layer, comprising or consisting of polymeric material, can be in form of one or more tapes, helically or longitudinally wound around the polymeric insulation system, with or without overlap. Each of said tapes can have a thickness of from about 1.0 mm to about 2.0 mm. The cushion layer can be, optionally, hygroscopic and/or semi-conductive.

The cushion layer provides a padding action between the polymeric insulation system and the copper barrier. The cushion layer can provide a water-blocking action for preventing longitudinal water penetration and as a mechanical shock absorber under the copper barrier, capable of absorbing impact forces and of preventing the underlying layers, particularly the outer polymeric semiconductive layer of the polymeric insulation system, from being damaged.

The power cable core 110 can comprise a polymeric sheath 140 around the copper barrier 120. An adhesive layer 145 can be interposed between the copper barrier 120 and the polymeric sheath 140, as in the embodiment illustrated in FIG. 1, in order to ensure the adhesion of the polymeric sheath 140 and the copper barrier 120. In some embodiments, the polymeric sheath 140 is a semiconductive layer of a semiconductive material. In some embodiments, the polymeric sheath 140 includes a semiconductive layer of a semiconductive material, among other layers.

The power cable 100 can be manufactured by a process that will be described in the following.

For the sake of simplicity the process will be described with reference to a plant 500 illustrated in FIG. 2 with reference to FIGS. 3a-3c.

The process comprises the step of providing a power cable core 110 comprising the electric conductor 115 and the polymeric insulation system 200 surrounding the electric conductor 115. Optionally the power cable core 110 comprises also the cushion layer 135 surrounding the insulation system 200. The manufacturing process of the power cable core 110 is not described and does not limit the scope of the disclosure. For example, the power cable core 110 can be made using any suitable approach. The power cable core 110 can be stored wound on a drum 510 and advanced along a forward direction X.

The process comprises also the step of providing a copper foil 300. The copper foil 300 can be stored wound on a second drum 520 and advanced along the forward direction X under the power cable core 110. In an embodiment, the copper foil 300 is caused to pass through a set of flattening rolls 500 to flatten and apply the proper tension to the copper foil. In the case of a corrugated metal barrier the proper tension can be provided by a suitable caterpillar.

In an embodiment, a centering unit aligns of the copper foil 300 with the axis of the welding line.

In an embodiment, a cutting device shave both the longitudinal rims 310 of the copper foil 300 in order to remove copper oxide and other potential sources of defects, like, for example, the presence of grease or the edge deformation, and in order to adjust the final width of the copper foil 300. The cutting device can be made of two cylinders with blades at their extremities.

According to the present disclosure, the process comprises the step of providing the protective strip 130 on the power cable core 110. The protective strip 130 can be stored wound on a third drum 530 and advanced along the forward direction X to meet the power cable core 110 at the axis of the welding line where the welding of the longitudinal rims 310 is intended.

The copper foil 300 is folded around the power cable core 110 so as to bring two longitudinal copper foil rims 310 to face one to the other. The folding of the copper foil 300 can start at a point of the manufacturing line upward the step of paying off the protective strip 130 to the power cable core 110, but it ends at a point of the manufacturing line where the protective strip 130 has already contacted the power cable core 110.

The folding step of the copper foil 300 is performed by using a forming unit 540 comprising, for example, successive sets of forming rolls or dies.

Then the two faced longitudinal copper foil rims 310 are put in contact with one another, optionally by applying a pressure, and welded by a welding unit 550 having a welding die 550a, thus obtaining the copper barrier 120 in form of a tube with a welding seam 125.

For example, the welding unit is a Tungsten Inert Gas (TIG) welding unit. The welding can be done by blowing a shielding gas, such as argon or helium or a mixture thereof, both from inside and outside the copper tube to avoid oxidation of the welding seam 125.

The inner diameter of the copper barrier obtained after the welding step is greater than the outer diameter of the power cable core 110 also in correspondence with the protective strip 130 applied thereto so that the welding occurs at a distance from the outer surface of the power cable core 110 and from the strip 130 sufficiently large in order to avoid that the heat and vapour generated during the welding can damage the power cable core 110 and the strip 130.

Then, the process provides the step of reducing a diameter of the copper barrier 120 to put its inner surface into direct contact with the outer surface of the power cable core 110 and with the strip 130.

In some embodiments, the reduction of the diameter of the copper barrier 120 is obtained by rolling. The rolling is performed by a rolling unit 560 that can comprise one or more rolling stages that are not described herein and does not limit the scope of the disclosure.

Then, the process comprises the step of heating the protective strip 130 and the copper barrier 120 at a temperature higher than the melting temperature of the coating of the strip 130 so that the coating of the strip 130 can fuse into with the welding seam 125.

The heating can be carried out through an inductor 590 or through hot air blowers that heat the copper barrier 120 to at least 100° C.

Besides allowing the melting of the protective strip coating into the copper sheath welding seam, the heating step enhances the adhesion between copper sheath 120 and polymeric sheath 140. An adhesive layer 145 can be extruded onto the copper barrier 120, e.g., by a second extruder 570b, to improve such adhesion.

After the heating step, the process comprises the step of extruding the polymeric sheath 140 around the copper barrier 120, optionally covered with an adhesive layer, by means of a first extruder 570a. The power cable so manufactured is then passed through a cooling trough 580.

The invention claimed is:

1. A process for manufacturing a power cable comprising:
providing a power cable core including an electric conductor and having an outer diameter;
providing a copper foil having a width such that, after folding of the copper foil to provide a copper sheath around the power cable core, the copper sheath has an inner diameter from 5 to 15 mm greater than the outer diameter of the power cable core;
providing a protective strip over the power cable core in a position substantially matching a welding die, the protective strip having a radially inner and outer surface and being made of copper with a coating, at least on the radially outer surface, made of a metal or a metal alloy having a melting temperature in a range between 90° C. and 250° C.;
folding the copper foil around the power cable core so as to bring two longitudinal copper foil rims to contact one another;
welding the two contacted longitudinal copper foil rims with a welding die to obtain a copper sheath in form of a tube with a welding seam and having a diameter;
reducing the diameter of the copper sheath to put it into direct contact with the power cable core and the protective strip;
heating the protective strip and the copper sheath at a temperature higher than the melting temperature of the coating of the protective strip so that the coating fuses in the welding seam and the protective strip contacts the welding seam; and
extruding a polymeric sheath around the copper sheath.

2. The process according to claim 1 wherein, before reducing the diameter, the copper sheath in form of a tube has an inner diameter from 8 to 10 mm greater than the outer diameter of the power cable core.

3. The process according to claim 1 wherein the reducing of the diameter of the copper sheath includes rolling the copper sheath.

4. The process according to claim 1 comprising, before extruding the polymeric sheath, extruding an adhesive layer around the copper sheath.

5. The process according to claim 1, wherein the polymeric sheath includes a semiconductive layer.

6. The process according to claim 1, wherein the polymeric sheath is semiconductive.

7. The process according to claim 1, wherein the heating of the copper sheath is of at least 100° C.

8. A power cable comprising:
a power cable core including an electric conductor, and having an outer diameter;
a copper sheath surrounding the power cable core and being in form of a tube with a welding seam; and
a protective strip between the power cable core and the copper sheath, the protective strip having a radially inner and outer surface and made of copper with a coating, at least on the radially outer surface, of a metal or of a metal alloy having a melting temperature in a range between 90° C. and 250° C., the coating being fused in the welding seam of the copper sheath and the protective strip contacting the welding seam.

9. The power cable according to claim 8 wherein the copper sheath has a thickness in a range from 0.2 mm to 1.5 mm.

10. The power cable according to claim 8 wherein the protective strip has a width in a range from 15 mm to 50 mm.

11. The power cable according to claim 8 wherein the protective strip has a thickness in a range from 0.05 mm to 0.3 mm.

12. The power cable according to claim 8 comprising a polymeric sheath around the copper sheath.

13. The power cable according to claim 12 comprising an adhesive layer interposed between the copper sheath and the polymeric sheath.

14. The power cable according to claim 8, wherein the polymeric sheath is a semiconductive.

15. The power cable according to claim 8, wherein the polymeric sheath includes a semiconductive layer.

* * * * *